US009248530B1

United States Patent
Bonini et al.

(10) Patent No.: US 9,248,530 B1
(45) Date of Patent: Feb. 2, 2016

(54) BACKSTRIKE PROTECTION DURING MACHINING OF COOLING FEATURES

(71) Applicant: General Electric Company, Schenectady, NY (US)

(72) Inventors: Eric Richard Bonini, Greer, SC (US); Ronald Scott Bunker, West Chester, OH (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 14/886,013

(22) Filed: Oct. 17, 2015

Related U.S. Application Data

(62) Division of application No. 13/705,758, filed on Dec. 5, 2012.

(51) Int. Cl.
| | | |
|---|---|---|
| *B23P 15/02* | (2006.01) | |
| *B23K 26/40* | (2014.01) | |
| *B23K 15/08* | (2006.01) | |
| *B23H 9/14* | (2006.01) | |
| *B23H 9/16* | (2006.01) | |
| *B22D 15/02* | (2006.01) | |

(52) U.S. Cl.
CPC ............... *B23P 15/02* (2013.01); *B22D 15/02* (2013.01); *B23H 9/14* (2013.01); *B23H 9/16* (2013.01); *B23K 15/085* (2013.01); *B23K 26/382* (2015.10); *B23K 26/40* (2013.01); *B23K 2203/02* (2013.01); *B23K 2203/08* (2013.01); *Y10T 29/49339* (2015.01); *Y10T 29/49341* (2015.01)

(58) Field of Classification Search
CPC ...... B23P 15/02; B23K 26/382; B23K 26/40; B23K 15/085; B23K 2203/08; B23K 2203/02; B23H 9/14; B23H 9/19; B22D 15/02; Y10T 29/49339; Y10T 29/49341
See application file for complete search history.

(56) References Cited

U.S. PATENT DOCUMENTS

| | | |
|---|---|---|
| 4,487,550 A | 12/1984 | Horvath et al. |
| 4,893,987 A | 1/1990 | Lee et al. |
| 5,564,902 A | 10/1996 | Tomita |
| 5,626,462 A | 5/1997 | Jackson et al. |
| 5,640,767 A | 6/1997 | Jackson et al. |
| 5,660,523 A | 8/1997 | Lee |

(Continued)

FOREIGN PATENT DOCUMENTS

EP 1387040 B1 4/2004

OTHER PUBLICATIONS

Hyams et al., "A Detailed Analysis of film Cooling Physics: Part III—Streamwise Injection With Shaped Holes," Journal of Turbomachinery, vol. 122, Issue 1, Jan. 2000, pp. 122-132.

(Continued)

*Primary Examiner* — Moshe Wilensky
(74) *Attorney, Agent, or Firm* — Ann M. Agosti

(57) ABSTRACT

A method of machining a component is provided. The component includes a substrate having an outer surface and an inner surface, where the inner surface defines at least one interior space. A core is disposed within each interior space. The method includes forming at least one hole in the substrate while the core is disposed within the respective interior space. Each hole extends through the substrate to provide fluid communication with the respective interior space. The method further includes removing the core from the respective interior space. The core may be a casting core or a subsequently formed core.

13 Claims, 5 Drawing Sheets

(56) References Cited

U.S. PATENT DOCUMENTS

| | | | |
|---|---|---|---|
| 5,875,549 A | 3/1999 | McKinley |
| 6,059,530 A | 5/2000 | Lee |
| 6,086,328 A | 7/2000 | Lee |
| 6,164,914 A | 12/2000 | Correia et al. |
| 6,190,129 B1 | 2/2001 | Mayer et al. |
| 6,214,248 B1 | 4/2001 | Browning et al. |
| 6,231,307 B1 | 5/2001 | Correia |
| 6,234,755 B1 | 5/2001 | Bunker et al. |
| 6,321,449 B2 | 11/2001 | Zhao et al. |
| 6,368,060 B1 | 4/2002 | Fehrenbach et al. |
| 6,383,602 B1 | 5/2002 | Fric et al. |
| 6,405,435 B1 | 6/2002 | Konter et al. |
| 6,412,541 B2 | 7/2002 | Roesler et al. |
| 6,427,327 B1 | 8/2002 | Bunker |
| 6,461,107 B1 | 10/2002 | Lee et al. |
| 6,461,108 B1 | 10/2002 | Lee et al. |
| 6,494,678 B1 | 12/2002 | Bunker |
| 6,551,061 B2 | 4/2003 | Darolia et al. |
| 6,582,194 B1 | 6/2003 | Birkner et al. |
| 6,602,052 B2 | 8/2003 | Liang |
| 6,602,053 B2 | 8/2003 | Subramanian et al. |
| 6,617,003 B1 | 9/2003 | Lee et al. |
| 6,634,860 B2 | 10/2003 | Lee et al. |
| 6,905,302 B2 | 6/2005 | Lee et al. |
| 6,921,014 B2 | 7/2005 | Hasz et al. |
| 6,994,514 B2 | 2/2006 | Soechting et al. |
| 7,014,923 B2 | 3/2006 | Schnell et al. |
| 7,094,475 B2 | 8/2006 | Schnell et al. |
| 7,186,167 B2 | 3/2007 | Joslin |
| 7,216,428 B2 | 5/2007 | Memmen et al. |
| 7,302,990 B2 | 12/2007 | Bunker et al. |
| 7,334,991 B2 | 2/2008 | Liang |
| 7,744,348 B2 | 6/2010 | Bezencon et al. |
| 7,766,617 B1 | 8/2010 | Liang |
| 7,775,768 B2 | 8/2010 | Devore et al. |
| 7,946,335 B2 | 5/2011 | Bewlay et al. |
| 8,147,196 B2 | 4/2012 | Campbell et al. |
| 8,210,815 B2 | 7/2012 | Bezencon et al. |
| 8,387,245 B2 | 3/2013 | Bunker et al. |
| 8,528,208 B2 | 9/2013 | Rebak et al. |
| 8,533,949 B2 | 9/2013 | Bunker et al. |
| 8,535,491 B2 | 9/2013 | Wei et al. |
| 8,601,691 B2 | 12/2013 | Rebak et al. |
| 8,651,805 B2 | 2/2014 | Lacy et al. |
| 8,673,397 B2 | 3/2014 | Bunker et al. |
| 8,727,727 B2 | 5/2014 | Bunker et al. |
| 8,739,404 B2 | 6/2014 | Bunker et al. |
| 8,752,289 B2 | 6/2014 | Jones |
| 8,753,071 B2 | 6/2014 | Bunker |
| 8,857,055 B2 | 10/2014 | Wei et al. |
| 8,905,713 B2 | 12/2014 | Bunker et al. |
| 2007/0181278 A1 | 8/2007 | Bancher et al. |
| 2012/0114868 A1 | 5/2012 | Bunker et al. |
| 2012/0148769 A1 | 6/2012 | Bunker et al. |
| 2012/0243995 A1 | 9/2012 | Bunker et al. |
| 2012/0328448 A1 | 12/2012 | Bunker |
| 2013/0043009 A1 | 2/2013 | Bunker et al. |
| 2013/0056184 A1 | 3/2013 | Bunker et al. |
| 2013/0078428 A1 | 3/2013 | Bunker et al. |
| 2013/0086784 A1 | 4/2013 | Bunker |
| 2013/0101761 A1 | 4/2013 | Bunker et al. |
| 2013/0156600 A1 | 6/2013 | Bunker |
| 2013/0272850 A1 | 10/2013 | Bunker |
| 2013/0312941 A1 | 11/2013 | Bunker |
| 2014/0116660 A1 | 5/2014 | Butler et al. |

OTHER PUBLICATIONS

Lambie et al., "An Overview on Micro-Meso Manufacturing Techniques for Micro-Heat Exchangers for Turbine Blade Cooling," International Journal Manufacturing Research, vol. 3, No. 1, 2008, pp. 3-26.

Bonini et al., "Methods of Forming Cooling Channels Using Backstrike Protection", U.S. Appl. No. 13/628,204, filed Sep. 27, 2012.

BACKSTRIKE PROTECTION DURING MACHINING OF COOLING FEATURES

BACKGROUND

The invention relates generally to gas turbine engines, and, more specifically, to forming holes in gas turbine engine components.

In a gas turbine engine, air is pressurized in a compressor and mixed with fuel in a combustor for generating hot combustion gases. Energy is extracted from the gases in a high pressure turbine (HPT), which powers the compressor, and in a low pressure turbine (LPT), which powers a fan in a turbofan aircraft engine application, or powers an external shaft for marine and industrial applications.

Engine efficiency increases with temperature of combustion gases. However, the combustion gases heat the various components along their flowpath, which in turn requires cooling thereof to achieve an acceptably long engine lifetime. Typically, the hot gas path components are cooled by bleeding air from the compressor. This cooling process reduces engine efficiency, as the bled air is not used in the combustion process.

Gas turbine engine cooling art is mature and includes numerous patents for various aspects of cooling circuits and features in the various hot gas path components. For example, the combustor includes radially outer and inner liners, which require cooling during operation. Turbine nozzles include hollow vanes supported between outer and inner bands, which also require cooling. Turbine rotor blades are hollow and typically include cooling circuits therein, with the blades being surrounded by turbine shrouds, which also require cooling. The hot combustion gases are discharged through an exhaust which may also be lined and suitably cooled.

In all of these exemplary gas turbine engine components, thin walls of high strength superalloy metals are typically used to reduce component weight and minimize the need for cooling thereof. Various cooling circuits and features are tailored for these individual components in their corresponding environments in the engine. For example, a series of internal cooling passages, or serpentines, may be formed in a hot gas path component. A cooling fluid may be provided to the serpentines from a plenum, and the cooling fluid may flow through the passages, cooling the hot gas path component substrate and any associated coatings. Holes may be formed to access internal regions within the component.

For many newer hot gas path components, it may be desirable to form cooling holes after a coating has been deposited. If the coating is a ceramic, this basically eliminates using EDM and similar machining techniques, as the ceramics typically are not electrically conductive. So for these applications, it would be desirable to use laser or abrasive liquid jet (ALJ) drilling to form the cooling holes. However, backstrike can be an issue with both of these techniques. For example, FIG. 6 of the present application illustrates a problem associated with forming the holes using ALJ. Namely, when ALJ drilling is used to make coolant supply holes into the interior cavities 114, once the ALJ punches through the substrate wall and defines the hole, the ALJ can also strike the interior surface of the opposite wall, thereby damaging that surface. Similar damage can occur with laser drilling.

It would therefore be desirable to provide backstrike protection to form cooling holes using laser or ALJ drilling.

BRIEF DESCRIPTION

One aspect of the present invention resides in a method of machining a component that includes a substrate having an outer surface and an inner surface, where the inner surface defines at least one interior space. A core is disposed within each interior space. The method includes forming at least one hole in the substrate, while the core is disposed within the respective interior space. Each hole extends through the substrate to provide fluid communication with the respective interior space. The method further includes removing the core from the respective interior space.

Another aspect of the present invention resides in a method of machining a component. The method includes casting a substrate around at least one casting core. The substrate has an outer surface and an inner surface, where the inner surface defines at least one interior space. Each casting core is disposed within each interior space. The method further includes forming at least one hole in the substrate, while the casting core is disposed within the respective interior space. Each hole extends through the substrate to provide fluid communication with the respective interior space. The method further includes removing the casting core from the respective interior space.

Yet another aspect of the present invention resides in a method of machining a component. The method includes casting a substrate around at least one casting core. The substrate has an outer surface and an inner surface, where the inner surface defines at least one interior space. The method further includes removing the casting core(s) from the respective interior space(s), at least partially filling the interior space(s) with a slurry, and at least partially curing the slurry to form a subsequently formed core. The method further includes forming at least one hole in the substrate, while the subsequently formed core(s) is (are) disposed within the respective interior space(s). Each hole extends through the substrate to provide fluid communication with the respective interior space. The method further includes removing the subsequently formed core(s) from the respective interior space(s).

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The modifier "about" used in connection with a quantity is inclusive of the stated value, and has the meaning dictated by context, (e.g., includes the degree of error associated with measurement of the particular quantity). In addition, the term "combination" is inclusive of blends, mixtures, alloys, reaction products, and the like.

Moreover, in this specification, the suffix "(s)" is usually intended to include both the singular and the plural of the term that it modifies, thereby including one or more of that term (e.g., "the passage hole" may include one or more passage holes, unless otherwise specified). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. Similarly, reference to "a particular configuration" means that a particular element (e.g., feature, structure, and/or characteristic) described in connection with the configuration is included in at least one configuration described herein, and may or may not be present in other configurations. In addition, it is to be understood that the described inventive features may be combined in any suitable manner in the various embodiments and configurations.

Figure 1:
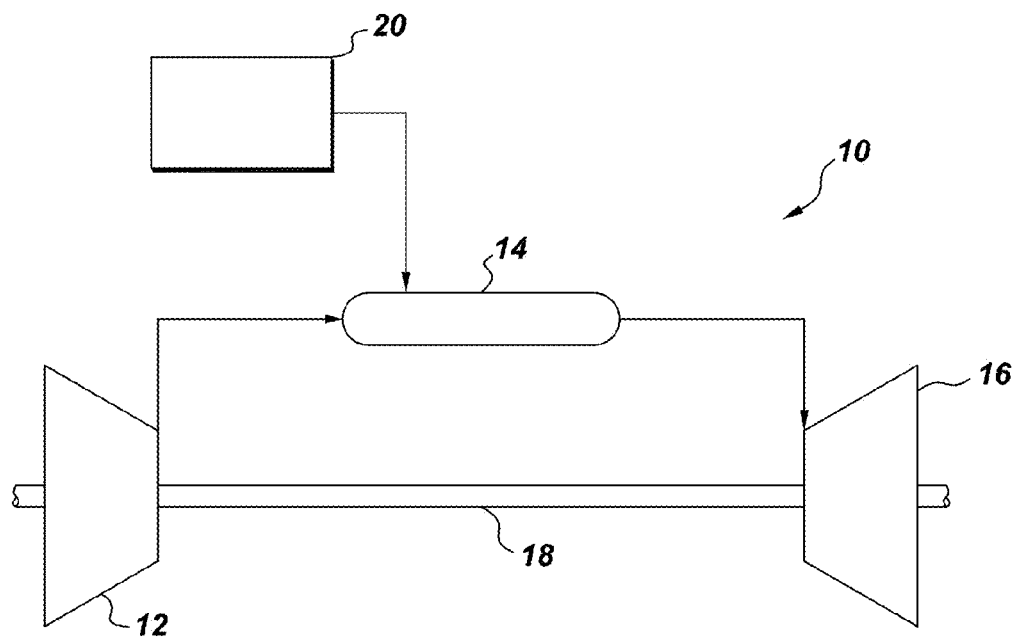
FIG. 1 is a schematic illustration of a gas turbine system.

FIG. 1 is a schematic diagram of a gas turbine system 10. The system 10 may include one or more compressors 12, combustors 14, turbines 16, and fuel nozzles 20. The compressor 12 and turbine 16 may be coupled by one or more shafts 18.

The gas turbine system 10 may include a number of hot gas path components 100. A hot gas path component is any component of the system 10 that is at least partially exposed to a high temperature flow of gas through the system 10. For example, bucket assemblies (also known as blades or blade assemblies), nozzle assemblies (also known as vanes or vane assemblies), shroud assemblies, transition pieces, retaining rings, and turbine exhaust components are all hot gas path components. However, it should be understood that the hot gas path component 100 of the present invention is not limited to the above examples, but may be any component that is at least partially exposed to a flow of high temperature gas. Further, it should be understood that the hot gas path component 100 of the present disclosure is not limited to components in gas turbine systems 10, but may be any piece of machinery or component thereof that may be exposed to high temperature flows.

When a hot gas path component 100 is exposed to a hot gas flow, the hot gas path component 100 is heated by the hot gas flow and may reach a temperature at which the hot gas path component 100 is substantially degraded or fails. Thus, in order to allow system 10 to operate with hot gas flow at a high temperature, as required to achieve the desired efficiency, performance and/or life of the system 10, a cooling system for the hot gas path component 100 is needed.

Figure 2:
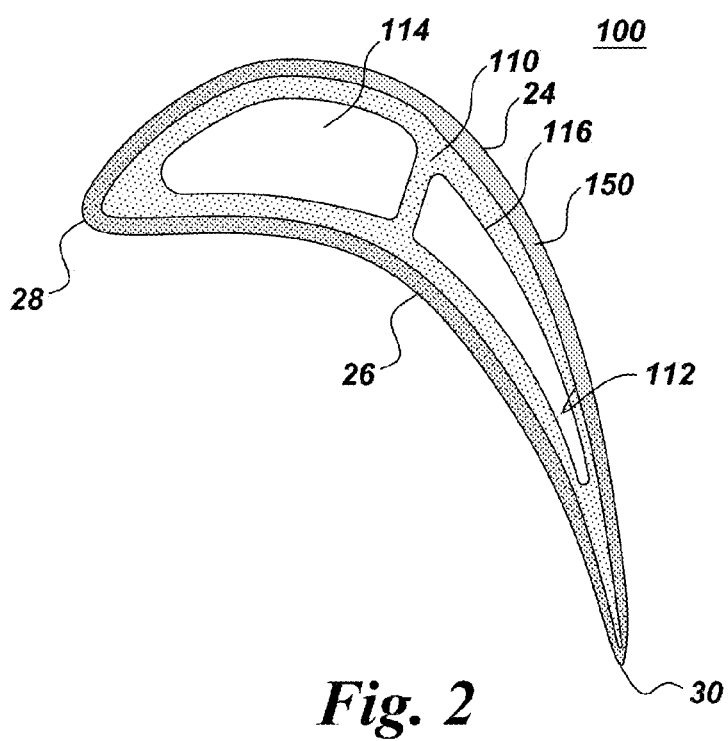
FIG. 2 is a schematic cross-section of an exemplary airfoil configuration.
Figure 3:
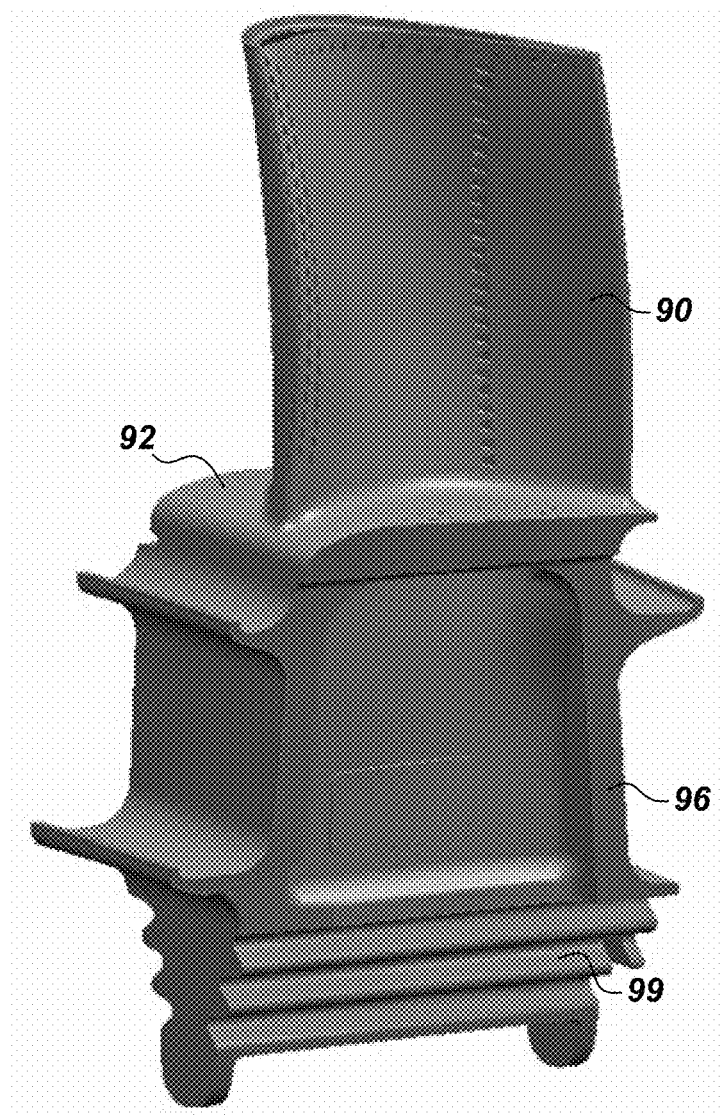
FIG. 3 shows an example hot gas path component with an airfoil, platform, shank, and dovetail.

A method of machining a component 100 is described with reference to FIGS. 2-9. As indicated, for example, in FIG. 2, the component 100 includes a substrate 110 having an outer surface 112 and an inner surface 116. As indicated for example in FIG. 2, the inner surface 116 defines at least one interior space 114. For the example arrangement shown in FIG. 2, the outer surface 112 of the substrate 110 defines a pressure side wall 24 and a suction side wall 26, where the pressure and suction side walls 24, 26 are connected together at a leading edge 28 and at a trailing edge 30 of the component 100. As shown in FIG. 2, the suction side 26 is convex-shaped and pressure side 24 is concave-shaped. The component being machined will vary, but one example component is shown in FIG. 3. The example hot gas path component show in FIG. 3 has an airfoil, platform, shank, and dovetail.

Figure 4:
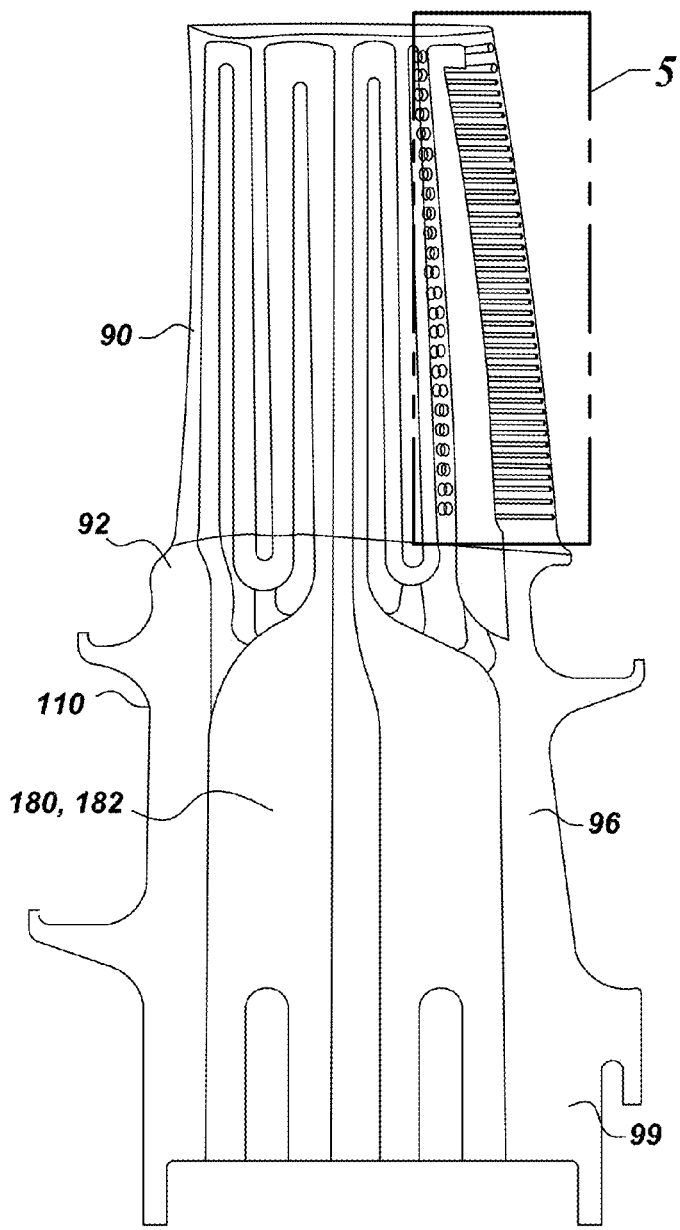
FIG. 4 is a cross-section of the hot gas path component of FIG. 3 with a core disposed within the interior spaces of the component's substrate.
Figure 5:
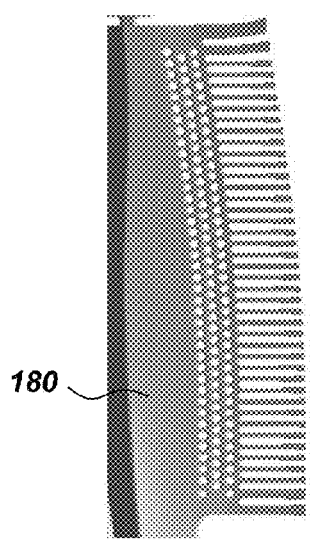
FIG. 5 shows a portion of the core of FIG. 4.
Figure 7:
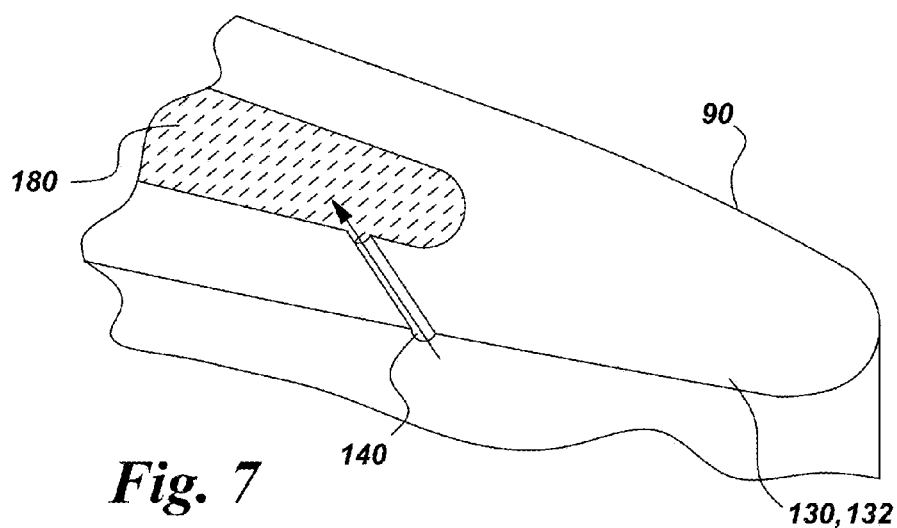
FIG. 7 illustrates the use of a ceramic core to prevent back-strike when forming hole(s) through a substrate to provide fluid connection with the interior space of the component.

As indicated in FIGS. 4, 5 and 7, a core 180 is disposed within each interior space 114. It should be noted that the core may be one integral core, or may be several cores that are connected together prior to casting the metal. Thus, the core disposed within each interior space might be one core that is connected at tip and root turn regions, for example, or several cores assembled prior to casting. An example core is shown in FIG. 5. This core is merely illustrative, and the core used will vary based on the component being formed and machined.

Figure 9:
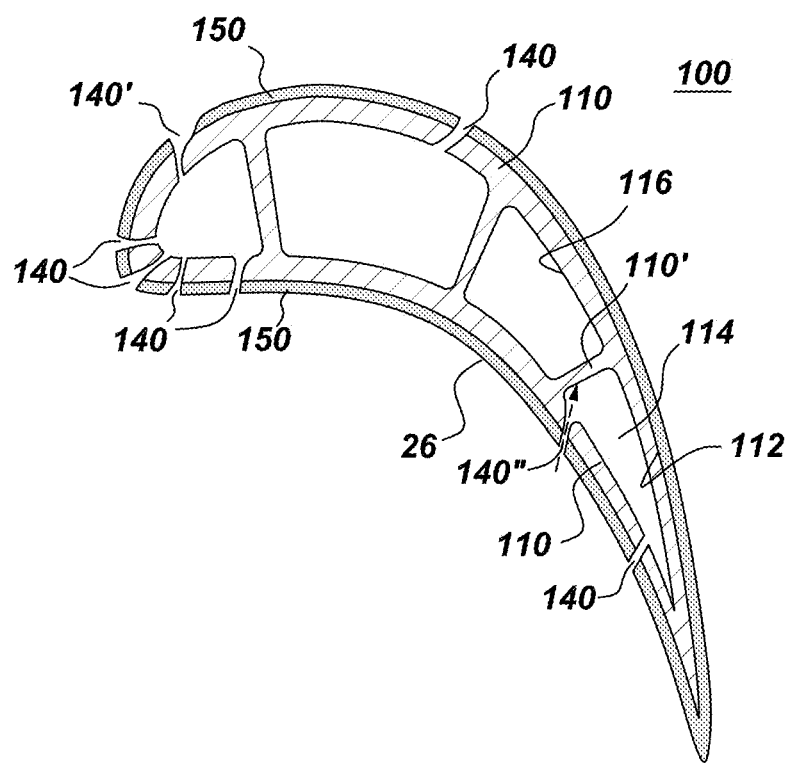
FIG. 9 is a schematic cross-section of an exemplary airfoil configuration with exemplary cooling holes.

Referring now to FIG. 7, the method includes forming at least one hole 140 in the substrate 110, while the core 180 is disposed within the respective interior space 114. As indicated in FIG. 9, for example, each hole 140 extends through the substrate to provide fluid communication with the respective interior space 114. For the exemplary airfoil configuration shown in FIG. 9, the cooling holes 140 are film cooling holes. As discussed below, the film holes may have different footprints, and the cooling hole 140' shown in FIG. 9 is a shaped cooling hole with a diffuser. FIG. 4 illustrates, in cross-sectional view, an exemplary hot gas path component, with a core disposed within the interior spaces of the component's substrate, and FIG. 5 shows a portion of the core of FIG. 4. Many different types of holes may be formed in the component using this technique, as discussed below with reference to FIG. 9.

Figure 6:
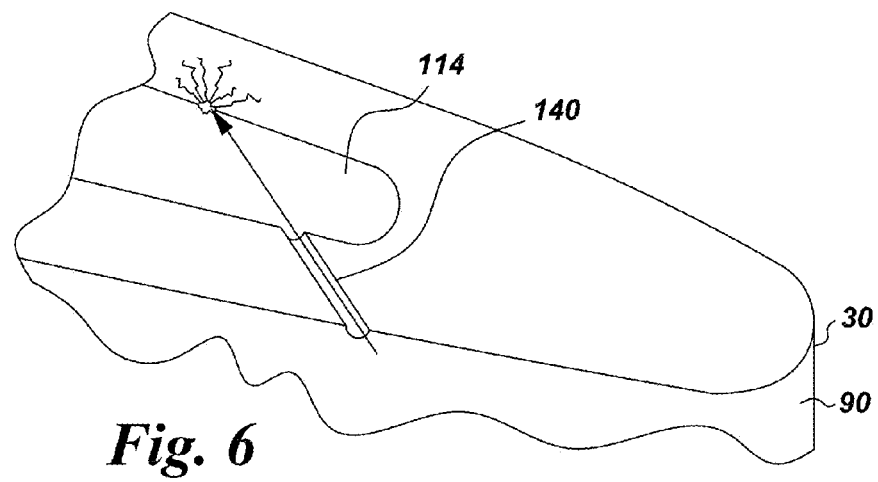
FIG. 6 illustrates a problem associated with forming holes to provide fluid connection with the interior space of the component.

For particular processes, the hole(s) 140 may be formed using laser or abrasive liquid jet (ALJ) drilling. However, FIG. 6 illustrates a problem associated with forming holes using ALJ. Namely, when ALJ drilling is used to drill holes into the interior cavities 114, once the ALJ punches through the wall, the ALJ can also strike the interior surface of the opposite wall, thereby damaging that surface. Similar damage can occur with laser drilling.

Beneficially, the use of a ceramic core when forming the hole(s) prevents back-strike, as illustrated in FIG. 7. In addition, this improved process may take advantage of the current processing of ceramic cores by simply leaving the core in the metal component as the backstop material to absorb and disperse the energy of the ALJ after it has penetrated the first wall. This improved process has several advantages over prior art techniques. For particular processes, the core 180 is at least partially cracked as a result of the formation of the hole(s) 140 in the substrate 110. Thus for these particular processes, the ALJ will serve to partially or completely break up the core material making it easier to leach out, especially in regions such as the trailing edge where leaching typically takes a very long time due to the restricted dimensions. In addition, the ceramic core is a solid material made of fine particles that can spread the ALJ energy better than larger particles of a distributed medium. Also, for particular processes, the core is already present from the casting operation.

Typically, the substrate 110 is cast prior to forming the hole(s). As discussed in U.S. Pat. No. 5,626,462, Melvin R. Jackson et al., "Double-wall airfoil," which is incorporated herein in its entirety, substrate 110 may be formed from any suitable material. Depending on the intended application for component 100, this could include Ni-base, Co-base and Fe-base superalloys. The Ni-base superalloys may be those containing both γ and γ' phases, particularly those Ni-base superalloys containing both γ and γ' phases wherein the γ' phase occupies at least 40% by volume of the superalloy. Such alloys are known to be advantageous because of a combination of desirable properties including high temperature strength and high temperature creep resistance. The substrate material may also comprise a NiAl intermetallic alloy, as these alloys are also known to possess a combination of superior properties including high-temperature strength and high temperature creep resistance that are advantageous for use in turbine engine applications used for aircraft. In the case of Nb-base alloys, coated Nb-base alloys having superior oxidation resistance will be preferred, particularly those alloys comprising Nb-(27-40)Ti-(4.5-10.5)Al-(4.5-7.9)Cr-(1.5-5.5)Hf-(0-6)V, where the composition ranges are in atom percent. The substrate material may also comprise a Nb-base alloy that contains at least one secondary phase, such as a Nb-containing intermetallic compound comprising a silicide, carbide or boride. Such alloys are composites of a ductile phase (i.e., the Nb-base alloy) and a strengthening phase (i.e., a Nb-containing intermetallic compound). For other arrangements, the substrate material comprises a molybdenum based alloy, such as alloys based on molybdenum (solid solution) with $Mo_5SiB_2$ and/or $Mo_3Si$ second phases. For other configurations, the substrate material comprises a ceramic matrix composite, such as a silicon carbide (SiC) matrix reinforced with SiC fibers. For other configurations the substrate material comprises a TiAl-based intermetallic compound.

Referring now to FIGS. 6 and 7, the method further includes removing the core 180 (FIG. 7) from the respective interior space 114. For particular configurations, the core 180 comprises a ceramic core 180. Non-limiting examples of suitable ceramic core materials include ceramic oxides, such as silica, alumina and yttria (yttrium oxide). For example, U.S. Pat. No. 4,097,292 (Huseby and Klug) describes core compositions based on various yttrium aluminates, including yttrium aluminum perovskite (YAP), yttrium aluminum garnet (YAG), and monoclinic yttrium aluminate (YAM). The compositions consist of either single phase materials of the aluminates, or two-phase mixtures thereof. As another example, U.S. Pat. No. 5,409,871 (Dodds and Alexander) describes core compositions based on yttrium aluminate and alumina ($Al_2O_3$). Moreover, U.S. Pat. No. 6,345,663 (Klug and Giddings) describes casting core precursor materials which include alumina, aluminum metal, a polymerizable binder, and various water/organic solutions. The precursor slurry can also contain various other constituents, such as colloidal silica, hafnium, yttrium aluminate, other rare earth aluminates, magnesium, and zirconium. In addition, U.S. Pat. No. 7,946,335 discloses a rare earth-based core for use in casting a reactive metal. The core contains a ceramic composition which includes at least about 10% by weight of monoclinic rare earth aluminate (RE4Al2O9), wherein RE represents at least one rare earth element; and at least about 10% by weight of at least one free rare earth oxide. The ceramic phase of the composition may include a microstructure which comprises a multitude of substantially spherical pores which are formed as a result of the removal of aluminum metal from the core composition during a heat treatment step.

For particular configurations, the core 180 is removed using a leaching process. Example leaching processes include a high temperature caustic solution autoclave process. As explained in U.S. Pat. No. 7,946,335, "cores containing monoclinic aluminates like YAM can be successfully removed from a casting by leaching with one or more acids." The following example process is taken from U.S. Pat. No. 7,946,335, which further explains:

Acids and acid-based treatment compositions (e.g., aqueous solutions) suitable for carrying out this process are described in U.S. patent application Ser. No. 11/276,002 (Klug et al), filed on Feb. 9, 2006, and incorporated herein by reference. Examples include hydrochloric acid, nitric acid, phosphoric acid, nitric/phosphoric acid, sulfuric acid, acetic acid, and various other combinations of the foregoing. The core is treated with an effective amount of the acid-based composition, i.e., an amount effective to remove substantially all of the core material. (Post-treatment steps can also be undertaken to remove residual core material, e.g., air-blowing, washing, and the like. The effective amount of the acid(s) will depend on a variety of factors, such as the particular composition of the core (e.g., how much $RE_4Al_2O_9$ compound is present); the acid system being used; and the type of alloy being cast, using the core. As a general guideline for some situations, the core can be treated with one or more of the following acids: about 5% to about 91% concentration nitric acid, about 2% to about 37% concentration HCl acid, about 50% to about 85% concentration phosphoric acid, about 5% to about 30% concentration sulfuric acid, and about 30% to about 90% concentration acetic acid. A factor in selecting a particular acid is its ability to dissolve the core material, while being substantially non-reactive with the material being cast, e.g., the niobium silicide. The preferred acid treatment composition often comprises nitric acid (e.g., an azeotropic mixture thereof); or a combination of nitric acid and phosphoric acid.

As noted in application Ser. No. 11/276,002, the acid treatment composition is usually heated, e.g., to its boiling temperature or slightly below that temperature, at a selected pressure. A variety of treatment techniques may be employed to dissolve the core. Most often, the casting is immersed in a bath which holds the acid composition. (The bath is often agitated.)

Further, U.S. Pat. No. 4,097,292 (Huseby and Klug) discloses a technique for removing ceramic cores with compositions based on various yttrium aluminates, including yttrium aluminum perovskite (YAP), yttrium aluminum garnet (YAG), and monoclinic yttrium aluminate (YAM). In particular, the ceramic cores from may be removed from castings of advanced superalloy materials using molten salts, such as molten fluoride salts and/or molten chloride salts. Such suitable salts are $M_3AlF_6$, $M_3AlF_6+MF$, $M_3AlF_6+M'F_2$ and $M_3AlF_6+MCl$, where M is Li, Na or K and M' is Mg, Ca, Ba, or Sr. In addition, a controlled atmosphere for covering the molten salt bath may be employed using one of argon, neon, hydrogen, nitrogen and helium, and a molten chloride salt bath may be provided, to serve as a rinse between the fluoride bath and a final water rinse.

Focusing now on the formation of the hole(s) 140, depending on the specific configuration, a number of techniques may be used to form the hole(s) 140. Example techniques for forming the hole(s) 140 include abrasive liquid jet, plunge electrochemical machining (ECM), electric discharge machining (EDM) with a spinning electrode (milling EDM), electron beam drilling, and laser machining, for example, percussive (pulsed) laser machining. Example laser machining techniques are described in commonly assigned, U.S. patent application Ser. No. 12/697,005, "Process and system for forming shaped air holes" filed Jan. 29, 2010, which is incorporated by reference herein in its entirety. Example EDM techniques are described in commonly assigned U.S. patent application Ser. No. 12/790,675, "Articles which include chevron film cooling holes, and related processes," filed May 28, 2010, which is incorporated by reference herein in its entirety.

Example ALJ drilling processes and systems are disclosed in U.S. patent application Ser. No. 12/790,675, "Articles which include chevron film cooling holes, and related processes". As explained in U.S. patent application Ser. No.

12/790,675, the abrasive liquid jet process typically utilizes a high-velocity stream of abrasive particles (e.g., abrasive "grit"), suspended in a stream of high pressure liquid, for example water. The pressure of the liquid may vary considerably, but is often in the range of about 35-620 MPa. A number of abrasive materials can be used, such as garnet, aluminum oxide, silicon carbide, and glass beads. It should be noted that the abrasive liquid jet is not 100% formed of liquid and abrasive particles, but has a large amount of air as well. In fact by volume, air is the largest constituent in a conventional abrasive water jet. Beneficially, the capability of abrasive liquid jet machining techniques facilitates the removal of material in stages to varying depths and with control over the shape of the machined features. For example, this allows the hole(s) 140 (described above with reference to FIGS. 6, 7 and 9) to be drilled either as a straight hole of constant cross section, a shaped hole (e.g., elliptical), or a converging or diverging hole (not shown).

In addition, and as explained in U.S. patent application Ser. No. 12/790,675, the abrasive liquid jet system may include a multi-axis computer numerically controlled (CNC) unit (not shown). The CNC systems themselves are known in the art, and described, for example, in US Patent Publication 2005/0013926 (S. Rutkowski et al), which is incorporated herein by reference in its entirety. CNC systems allow movement of the cutting tool along a number of X, Y, and Z axes, as well as the tilt axes.

Referring now to FIG. 2, the method may further include disposing a coating 150 over at least a portion of the outer surface 112 of the substrate 110. Coating 150 comprises a suitable material and is bonded to the component.

For particular configurations, the coating 150 has a thickness in the range of 0.1-2.0 millimeters, and more particularly, in the range of 0.2 to 1 millimeters, and still more particularly 0.2 to 0.5 millimeters for industrial components. For aviation components, this range is typically 0.1 to 0.25 millimeters. However, other thicknesses may be utilized depending on the requirements for a particular component 100.

The coating 150 may include structural coating layers and/or additional coating layer(s). The coating layer(s) may be deposited using a variety of techniques. For particular processes, structural coating layer(s) may be deposited by performing ion plasma deposition (also known in the art as cathodic arc deposition). Example ion plasma deposition apparatus and method are provided in commonly assigned, US Published Patent Application No. 20080138529, Weaver et al, "Method and apparatus for cathodic arc ion plasma deposition," which is incorporated by reference herein in its entirety. Briefly, ion plasma deposition comprises placing a consumable cathode having a composition to produce the desired coating material within a vacuum environment within a vacuum chamber, providing a substrate 110 within the vacuum environment, supplying a current to the cathode to form a cathodic arc upon a cathode surface resulting in arc-induced erosion of coating material from the cathode surface, and depositing the coating material from the cathode upon the substrate surface 112.

Non-limiting examples of a coating deposited using ion plasma deposition include structural coatings, as well as bond coatings and oxidation-resistant coatings, as discussed in greater detail above with reference to U.S. Pat. No. 5,626,462, Jackson et al., "Double-wall airfoil." For certain hot gas path components 100, the structural coating comprises a nickel-based or cobalt-based alloy, and more particularly comprises a superalloy or a (Ni,Co)CrAlY alloy. Where the substrate material is a Ni-base superalloy containing both γ and γ' phases, structural coating may comprise similar compositions of materials, as discussed in greater detail above with reference to U.S. Pat. No. 5,626,462. Additionally, for superalloys the structural coating 54 may comprise compositions based on the γ'-Ni$_3$Al family of alloys.

More generally, the structural coating composition will be dictated by the composition of the underlying substrate.

For other process configurations, a structural coating may be deposited by performing at least one of a thermal spray process and a cold spray process. For example, the thermal spray process may comprise combustion spraying or plasma spraying, the combustion spraying may comprise high velocity oxygen fuel spraying (HVOF) or high velocity air fuel spraying (HVAF), and the plasma spraying may comprise atmospheric (such as air or inert gas) plasma spray, or low pressure plasma spray (LPPS, which is also known as vacuum plasma spray or VPS). In one non-limiting example, a (Ni, Co)CrAlY coating is deposited by HVOF or HVAF. Other example techniques for depositing the structural coating include, without limitation, sputtering, electron beam physical vapor deposition, entrapment plating, and electroplating.

For certain configurations, it is desirable to employ multiple deposition techniques for depositing structural and/or additional coating layers. For example, a first structural coating layer may be deposited using an ion plasma deposition, and a subsequently deposited layer and optional additional layers (not shown) may be deposited using other techniques, such as a combustion spray process or a plasma spray process. Depending on the materials used, the use of different deposition techniques for the coating layers may provide benefits in properties, such as, but not restricted to strain tolerance, strength, adhesion, and/or ductility.

For certain processes, the coating 150 is disposed prior to the step of forming the hole(s) 140, such that each hole 140 extends through the coating 150. See for example, FIG. 9.

However, for other processes, the method may include disposing a coating 150 over at least a portion of the outer surface 112 of the substrate 110 after the step of forming the hole(s) 140 has been performed. For particular configurations, the coating 150 does not completely cover the hole(s) 140. This can be achieved in several ways. The hole (or a portion thereof, for example the exit region) may be machined to a larger diameter than intended in the final product, and the coating may then be allowed to "coat down" inside the hole thereby reducing the diameter to the desired value. For specific processes, only the exit region of the hole would be over-sized, since the coatings do not deposit all the way inside the entire hole. For other processes, a material can be deposited inside the hole to prevent coat down, then this material would be removed, for example by heating, after the coatings have been applied.

Figure 8:
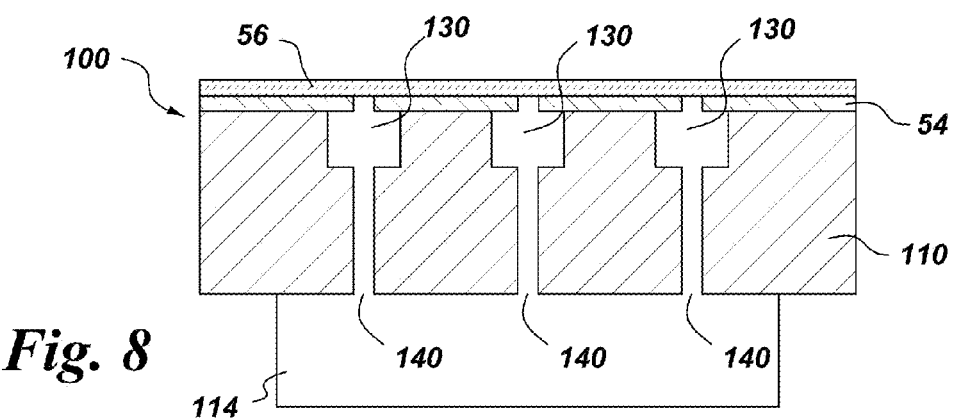
FIG. 8 shows the arrangement of FIG. 12 from U.S. patent application Ser. No. 12/975,609, "Formation of Micro Cooling Passive Cooling Holes"

However, for other configurations, the coating 150 covers the hole(s) 140. See, commonly assigned U.S. patent application Ser. No. 12/975,609, "Formation of Micro Cooling Passive Cooling Holes", which is which is incorporated herein by reference in its entirety. As described in U.S. patent application Ser. No. 12/975,609, with reference to FIG. 12 thereof, which is shown here in FIG. 8 (with the elements renumbered for consistency with the present application), a second, metallic structural coating layer 56 is then applied over first coating 54. As indicated in FIG. 8, the second coating 56 covers the upper outlet of each of the passive cooling holes, making the holes "passive", as described below. As in the case of the first coating 54, the second coating 56 may also be substantially non-porous, and can be formed of any of the metallic materials described above; e.g, superalloys, metal aluminides, MCrAl(X) materials, and the like.

As one non-limiting illustration, the second coating could be formed of an MCrAl(X) material, when the first coating is formed of a superalloy material. The coating can also be applied by any of the techniques described previously. The thickness for the second metallic structural coating 56 will depend on various factors, like some of those listed previously for the first layer 54. The second layer 56 should be thick enough to "bridge over" the passive cooling holes and to adequately support a subsequently-applied ceramic material. Usually, the second coating is at least about 0.1 mm in thickness. In most embodiments, the thickness is in the range of about 0.1 mm to about 0.5 mm) (In some embodiments, at least one more metallic coating, i.e., a third layer (not shown), may be applied.

Referring now to FIG. 4, the method may include the step of casting the substrate 110 around the core 180, prior to forming the hole(s) 140, such that the core is the casting core. This particular process is advantageous in that no addition core need be used and also in that the core may be at least partially cracked during the machining of the hole(s), which may make it easier to remove the core from the interior space.

However, for other processes, the casting core is not used for backstrike protection but rather is removed after casting and a new core is formed and used for backstrike protection. For this latter process, the method of further includes disposing the core 180 within the respective interior space 114 prior to forming the hole(s) 140 in the substrate 110 by performing the following process. First, the interior space(s) 114 is (are) at least partially filled with a slurry 182. For particular processes, the slurry 182 is a ceramic slurry 182, such that the core 180 comprises a ceramic core 180. Next, the slurry 182 is at least partially cured to form the core 180. In this manner, the core(s) is (are) disposed within the respective interior space(s) 114 prior to forming access hole(s) 140. Thus, for this process, the core 180 is not a casting core but is instead a subsequently formed core 180, which then serves as a backstop during formation of the hole(s).

For particular processes, the interior space(s) 114 may be partially filled with the slurry 182, such that the subsequently formed core 180 only partially fills the least one interior space 114. However, for other process configurations, the interior space(s) 114 may be completely filled with the slurry 182, such that the subsequently formed core 180 completely fills the respective interior space 114. It should be noted that the subsequently formed core need not have the same chemistry or properties (density, hardness) as the original casting core.

Beneficially, removal of the casting core and use of a subsequently deposited core as a back stop may present less logistical challenges relative to the use of the casting core as the backstop, in that the present core removal process need not be interrupted. In addition, this process would facilitate the use of partial fills. Also, more advantageous core materials may be employed. Because a subsequently formed core need not survive a casting process, lower temperature materials can be employed. For example, a cement slurry or more easily removed low-temperature core material, such as the adhesive and tooling compound marked under the name Duralco™4540, may be used.

For the exemplary airfoil configuration shown in FIG. 9, the holes 140 are film hole 140. The film holes may have different shapes. For example, the hole 140' in FIG. 9 is a shaped film hole with a diffuser. It should be noted that the above described-technique may be used to provide backstrike protection when forming a variety of holes, in addition to the film holes described above with reference to FIG. 9. For example, the holes may comprise one or more of passive cooling holes, blade tip dust holes, purge holes, airfoil trailing edge holes, film slots, sealing holes, sealing slots, endwall/platform/shroud/tip-shroud perimeter holes, and combinations thereof. In particular, backstrike protection may be particularly critical near the trailing edge (TE) of the airfoil because the distance between the opposing walls of the substrate may be too short to defocus the ALJ such that the opposing wall may be damaged in the absence of backstrike protection, so backstrike protection can be critical in the vicinity of the TE. Similarly, for sharply angled holes (see 140" in FIG. 9), the ALJ may strike and damage an opposing wall (110' in FIG. 9) in the absence of backstrike protection, so backstrike protection can be critical in the vicinity of sharply angled holes (such as 140" in FIG. 9).

As noted above, for particular processes, the casting core 180 is used for backstrike protection. For these processes, the method of machining a component 100 includes casting a substrate 110 around at least one casting core 180. As discussed above with reference to FIG. 2, the substrate 110 has an outer surface 112 and an inner surface 116, where the inner surface 116 defines at least one interior space 114. The substrate is cast while the casting core(s) 180 is (are) disposed within the respective interior space(s) 114. Suitable materials for substrate 110 are described above.

Referring now to FIG. 7, the machining method further includes forming at least one hole 140 in the substrate 110, while the casting core 180 is disposed within the respective interior space 114. Each hole 140 extends through the substrate to provide fluid communication with the respective interior space 114. As discussed above, this technique may be used to provide backstrike protection when forming a variety of holes, including without limitation, film holes, passive cooling holes, blade tip dust holes, purge holes, airfoil trailing edge holes, film slots, sealing holes, sealing slots, endwall/platform/shroud/tip-shroud perimeter holes, and combinations thereof.

Referring now to FIGS. 6 and 7, the method further includes removing the casting core 180 (FIG. 7) from the respective interior space 114. For particular configurations, the casting core 180 comprises a ceramic core 180. Non-limiting examples of suitable ceramic core materials include ceramic oxides, such as silica, alumina and yttria (yttrium oxide). As discussed above, ceramic cores 180 may be removed using a leaching process. Beneficially, the casting core may at least partially crack as a result of the formation of the hole(s) 140 in the substrate 110, which may make it easier to remove the casting core 180.

Referring now to FIG. 2, for particular processes, the method may further include disposing a coating 150 over at least a portion of the outer surface 112 of the substrate 110. For the particular process illustrated by FIG. 9, the coating 150 is disposed prior to the step of forming the hole(s) 140, such that each hole 140 extends through the coating 150.

However, for other processes, the method may include disposing a coating 150 over at least a portion of the outer surface 112 of the substrate 110 after the step of forming the hole(s) 140 has been performed. For particular configurations, the coating 150 does not completely cover the hole(s) 140, as discussed above with reference to FIG. 9. However, for other configurations (discussed above with reference to FIG. 8), the coating 150 covers the hole(s), such that the hole comprises a passive cooling hole.

Beneficially, using the casting core for backstrike protection during formation of the cooling hole(s) helps to prevent damage to the opposing interior wall. In this way, the above described processes can take advantage of the current use of casting cores by simply leaving the core in the metal component as the backstop material to absorb and disperse the energy of the ALJ after it has penetrated the first wall. Thus, these processes have several advantages. First, the ALJ will serve to partially or completely break up the core material making it easier to leach out, especially in regions such as the trailing edge where leaching typically takes a very long time due to the restricted dimensions. Further, the ceramic core is a solid material made of fine particles that can spread the ALJ energy better than larger particles. In addition, the core is already present from the casting operation, so no additional backstop material need be provided.

However, for other processes it may be beneficial to use another core as a backstop during formation of the cooling hole(s). For these processes, the method of machining a component 100 includes casting a substrate 110 around at least one casting core 180, as described above with reference to FIG. 2. As shown in FIG. 2, the substrate 110 has an outer surface 112 and an inner surface 116, where the inner surface 116 defines at least one interior space 114. Referring now to FIG. 7, the machining method includes removing the casting core(s) 180 from the respective interior space(s) 114. Next, the interior space(s) 114 is (are) at least partially with a slurry 182 and and at least partially curing the slurry 182 to form a subsequently formed core (which is also indicated by reference numeral 180). Techniques and materials for forming the subsequently formed core(s) 180 are provided above. For particular processes, the slurry 182 comprises a ceramic slurry 182, such that the subsequently formed core 180 comprises a subsequently formed ceramic core 180, and where the subsequently formed ceramic core 180 is removed using a leaching process. Beneficially, the subsequently formed may at least partially crack as a result of the formation of the hole(s) 140 in the substrate 110, which may make it easier to remove the subsequently formed core 180. For certain process configurations, the interior space(s) 114 is (are) completely filled with the slurry 182. However, for other process configurations, the interior space(s) 114 is (are) partially filled with the slurry 182, such that the subsequently formed core 180 partially fills the interior space(s) 114. It should be noted that the subsequently formed core need not have the same chemistry or properties (density, hardness) as the original casting core.

As indicated in FIG. 7, for example, the method further includes forming at least one hole 140 in the substrate 110, while the subsequently formed core 180 is disposed within the respective interior space 114. As discussed above with reference to FIGS. 7 and 9, each hole 140 extends through the substrate to provide fluid communication with the respective interior space 114. As discussed above, this technique may be used to provide backstrike protection when forming a variety of holes, including without limitation, film holes, passive cooling holes, blade tip dust holes, purge holes, airfoil trailing edge holes, film slots, sealing holes, sealing slots, endwall/platform/shroud/tip-shroud perimeter holes, and combinations thereof. Example holes and techniques for forming the holes are described above, with reference to FIGS. 7-9. Similar to the methods described above, the use of the newly formed core when forming the hole(s) prevents back-strike.

Referring now to FIGS. 6 and 7, the method further includes removing the subsequently formed core 180 (FIG. 7) from the respective interior space 114. As noted above, suitable techniques for removal of the core will depend on the core material. For example, ceramic cores may be removed by leaching. More generally and depending on the specific core composition, the subsequently formed core may be removed using techniques typically used to remove the casting cores.

Under certain circumstances, use of a subsequently formed core may have certain advantages. For example, this may have logistical advantages of not interrupting the present core removal process. In addition, this process would allow a partial fill with a more advantageous material. Because a subsequently formed core need not survive a casting process, lower temperature materials can be employed. For example, a cement slurry or more easily removed low-temperature core material, such as the adhesive and tooling compound marked under the name Duralco™4540, may be used.

Similar to the methods described above, the machining method may further include disposing a coating 150 (FIG. 2) over at least a portion of the outer surface 112 of the substrate 110. For the particular process illustrated by FIG. 9, the coating 150 is disposed prior to the step of forming the hole(s) 140, such that each hole 140 extends through the coating 150.

However, for other processes, the method may include disposing a coating 150 over at least a portion of the outer surface 112 of the substrate (110) after the step of forming the hole(s) (140) has been performed. For particular configurations, the coating 150 does not completely cover the hole(s) 140, as discussed above with reference to FIG. 9. However, for other configurations (discussed above with reference to FIG. 8), the coating 150 covers the hole(s), such that the hole comprises a passive cooling hole.

The above-described technique is particularly advantageous when machining holes after the coating has been deposited. Because ceramic coatings may not be suitable candidates for machining techniques, such as EDM, laser drilling and/or ALJ machining may be used to form these holes, such that backstrike would become an issue, without the use of the above-described techniques. In addition, backstrike for ALJ may be more of an issue near the trailing edge of the component because there may not be enough distance between the opposing walls to defocus the liquid jet before it strikes an opposing wall. Backstrike may also be an issue when forming sharply angled holes, such as 140" in FIG. 9, absent the use of the above-described techniques.

Beneficially, in the above described processes, the core (either the casting core or a subsequently formed core) acts to absorb and disperse the abrasive liquid jet (ALJ) energy to prevent damage to the opposing interior wall. In this way, the above described processes can take advantage of the current use of casting cores by simply leaving the core in the metal component as the backstop material to absorb and disperse the energy of the ALJ after it has penetrated the first wall. Thus, these processes have several advantages. First, the ALJ will serve to partially or completely break up the core material making it easier to leach out, especially in regions such as the trailing edge where leaching typically takes a very long time due to the restricted dimensions. Further, the ceramic core is a solid material made of fine particles that can spread the ALJ energy better than larger particles. In addition, the core is already present from the casting operation, so no additional backstop material need be provided.

Although only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of machining a component comprising a substrate having an outer surface and an inner surface, wherein the inner surface defines at least one interior space, and wherein a core is disposed within each interior space the method comprising:

casting the substrate around a casting core;

removing the casting core from the respective interior space;

disposing a subsequently formed core within the respective interior space by at least partially filling the at least one interior space with a cement slurry and at least partially curing the cement slurry to form the subsequently formed core;

disposing a coating over at least a portion of the outer surface of the substrate;

forming at least one hole in the substrate and coating, while the subsequently formed core is disposed within the respective interior space, wherein each hole extends through the substrate and coating to provide fluid communication with the respective interior space; and removing the subsequently formed core from the respective interior space.

2. The method of claim 1, wherein the casting core comprises a ceramic core.

3. The method of claim 1, wherein the casting core is removed using a leaching process.

4. The method of claim 1, wherein the subsequently formed core is at least partially cracked as a result of the forming the hole(s) in the substrate.

5. The method of claim 1, wherein the coating has a thickness in the range of 0.1-2.0 millimeters.

6. A method of machining a component, the method comprising:

casting a substrate around at least one casting core, the substrate having an outer surface and an inner surface, wherein the inner surface defines at least one interior space, and wherein each casting core is disposed within each interior space;

removing the casting core(s) from the respective interior space(s);

disposing at least one non-casting core within the at least one interior space by at least partially filling each of the respective interior space(s) with a cement slurry and at least partially curing the cement slurry to form the non-casting core(s) within each interior space;

disposing a coating over at least a portion of the outer surface of the substrate;

forming at least one hole in the substrate and the coating, while the non-casting core is disposed within the respective interior space, wherein each hole extends through the substrate and coating to provide fluid communication with the respective interior space; and removing the non-casting core from the respective interior space.

7. The method of claim 5, wherein the casting core comprises a ceramic core, and wherein the casting core is removed using a leaching process.

8. The method of claim 5, wherein the coating has a thickness in the range of 0.1-2.0 millimeters.

9. A method of machining a component, the method comprising:

casting a substrate around at least one casting core, the substrate having an outer surface and an inner surface, wherein the inner surface defines at least one interior space;

removing the casting core(s) from the respective interior space(s);

at least partially filling the interior space(s) with a cement slurry; and at least partially curing the cement slurry to form a subsequently formed core;

disposing a coating over at least a portion of the outer surface of the substrate;

forming at least one hole in the substrate and coating, while the subsequently formed core(s) is (are) disposed within the respective interior space(s), wherein each hole extends through the substrate and coating to provide fluid communication with the respective interior space; and removing the subsequently formed core(s) from the respective interior space(s).

10. The method of claim 9, wherein the subsequently formed core comprises a cement core, and wherein the subsequently formed core is removed using a leaching process.

11. The method of claim 9, wherein the coating has a thickness in the range of 0.1-2.0 millimeters.

12. The method of claim 9, wherein the at least one interior space is completely filled with the cement slurry.

13. The method of claim 9, wherein the interior space is partially filled with the cement slurry, such that the subsequently formed core only partially fills the interior space.

* * * * *